No. 745,196. PATENTED NOV. 24, 1903.
L. A. & C. N. KING.
EGG BOILER AND SERVER.
APPLICATION FILED DEC. 30, 1902.
NO MODEL.
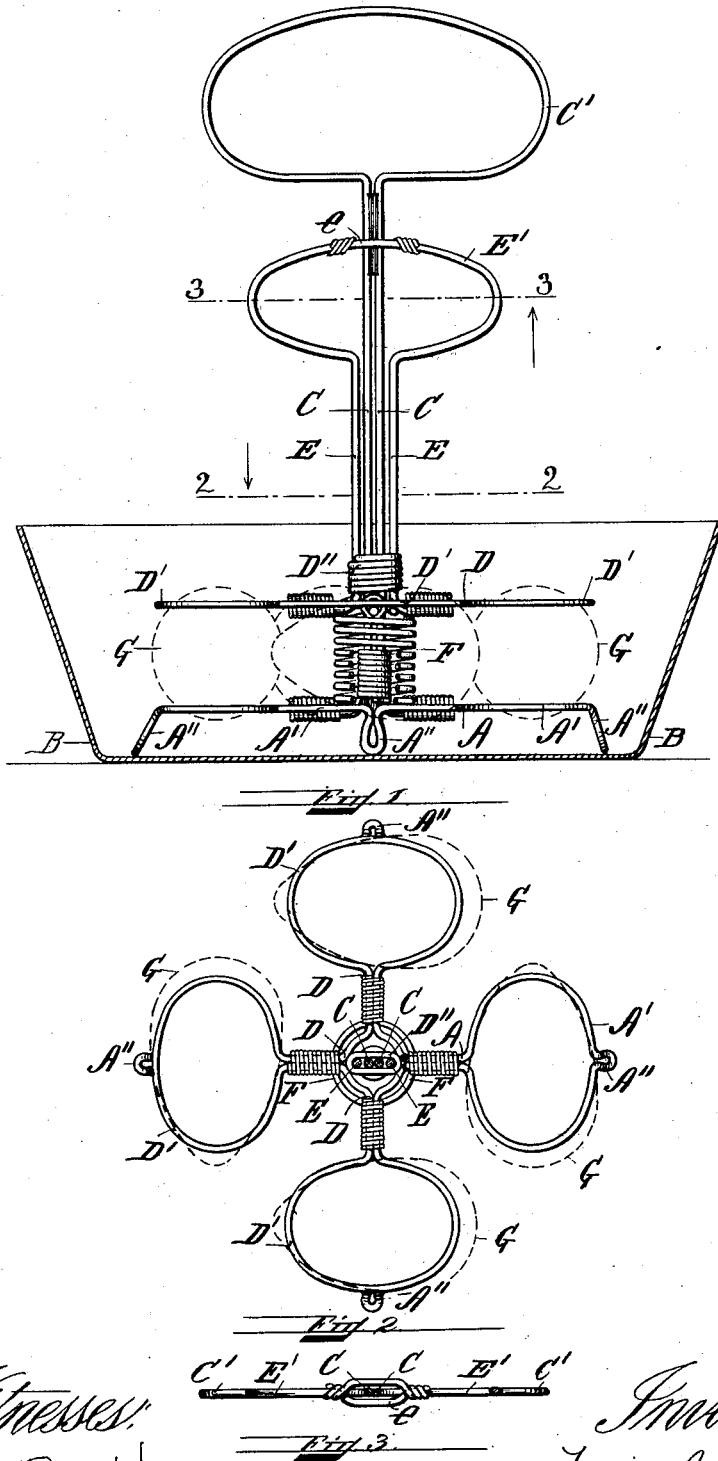

No. 745,196. Patented November 24, 1903.

UNITED STATES PATENT OFFICE.

LOUIS A. KING AND CHARLES N. KING, OF SALEM, MASSACHUSETTS.

EGG BOILER AND SERVER.

SPECIFICATION forming part of Letters Patent No. 745,196, dated November 24, 1903.

Application filed December 30, 1902. Serial No. 137,124. (No model.)

*To all whom it may concern:*

Be it known that we, LOUIS A. KING and CHARLES N. KING, citizens of the United States, and residents of Salem, in the county of Essex and State of Massachusetts, have jointly invented certain new and useful Improvements in Egg Boilers and Servers, of which the following is a specification.

This invention relates to an improved device for holding eggs or other food—such as, for instance, potatoes, tomatoes, cup-custards, &c.—while being boiled or cooked and serving such food on the table, as will hereinafter be more fully shown and described, reference being had to the accompanying drawings, wherein—

Figure 1 is a side elevation of the improved device, showing in dotted lines a series of eggs or other food attached to it during the cooking or serving operation. Fig. 2 is a cross-section on the line 2 2 shown in Fig. 1, and Fig. 3 is a cross-section on the line 3 3 shown in Fig. 1.

Similar letters refer to similar parts wherever they occur on the different parts of the drawings.

The device is made of bent wire and is composed of a lower skeleton frame A, provided with a series of radially-arranged curved eyes, loops, or food-holders A' A' of suitable shape provided on their under sides with downwardly-projecting feet or supports A" A", adapted to hold the eggs or other food raised above the bottom of the culinary vessel B, in which the food is cooked, and for the purpose of holding such eggs or food from contact with the table on which it is served after being cooked, as shown in Fig. 1.

To the middle portion of the lower skeleton frame A is secured in any suitable manner an upwardly-projecting post, preferably composed of a pair of parallel wires C C, terminating in a T-shaped or skeleton lifter-handle C', as shown in Fig. 1.

Above the stationary skeleton frame A is arranged a vertically-adjustable skeleton frame D, provided with a series of radially-arranged curved eyes, loops, or food-holders D' D', similar to the stationary ones A' A', and to such vertically-adjustable food-holders is attached in a suitable manner a vertically-adjustable post, preferably composed of two parallel wires E E, terminating in a T-shaped or I-shaped handle E', as shown in Fig. 1. To the upper end of said handle E' is attached a guide strip or wire e, surrounding the post-wires E E and serving to prevent the handle E' and its skeleton-frame food-holders D' D' from turning around the post-wires C C and serving to hold the adjustable upper food-holders D' D' in alinement with the lower food-holders A' A' during the vertical adjustment of the food-holders D' D' relative to the lower ones A' A'.

In practice we prefer to attach to the vertically-adjustable skeleton frame D a guide-sleeve D", preferably made of coiled wire, for guiding the post E E relative to the stationary post C C, as shown in the drawings.

The skeleton frames A and D are connected by means of a coiled-wire spring F, which serves when released to hold the food in position between the loops of the said skeleton frames A and D.

G in dotted lines represents the eggs or other food held in position by the loops or eyes of the lower stationary frame A and upper spring-pressed food-holder D during the cooking or serving operation. The loops or eyes of the said stationary and movable frames may be made of any suitable size, form, or shape, so as to be serviceable for holding and retaining eggs, potatoes, or other vegetables, or food in cups—such as, for instance, cup-custards, &c.—during the cooking and serving operation.

In placing the food G in position between the frames A D previous to cooking the food the operator takes hold of the upper and lower handles C' E' and raises the handle E' and its frame D against the influence of the coiled spring F sufficiently to allow the insertion of the food between the loops of the frames A and D, after which the handle E' is released, causing the spring F to move the loops of the frame D into yielding pressure in contact with the food G and hold it in such a position preparatory to cooking it. After the food is cooked the holder may be placed upon a table, &c., for serving. To remove the cooked food, it is only necessary to slightly raise the handle E and spring-pressed frame D, when the cooked articles may readily be detached from the holder.

The device is very simple in construction, is composed of a very few parts, very light and portable, and serves as a ready means for holding food in position while cooking, after which it may readily be removed and placed upon a table, &c., ready for serving, as hereinabove described.

What we wish to secure by Letters Patent and claim is—

1. A device of the character described, comprising a lower frame provided with a series of loops each having an integral depending support, vertical members connected at their lower end with said frame and at their top terminating in a handle, an upper frame provided with a series of loops adapted to be in alinement with the loops of the lower frame, a spring connecting said frames together, and vertical members connected at their lower end with said upper frame and at their top terminating in a handle.

2. A device of the character described, comprising a lower frame provided with a series of loops, each of said loops having an integral depending support, vertical members connected at their lower end with said frame and at their top terminating in a handle, an upper frame provided with a series of loops adapted to be in alinement with the loops of the lower frame, a spring connected at its upper end to the upper frame and at its lower end to the lower frame and adapted to draw the upper frame toward the lower frame for retaining articles of food between said frames, and vertical members connected at their lower end with said upper frame and at their top terminating in a handle.

3. A device of the character described, comprising a lower frame provided with a series of loops each having an integral depending support, vertical members connected at their lower end with said frame and at their top terminating in a handle, an upper frame provided with a series of loops adapted to be in alinement with the loops of the lower frame, a spring connecting said frames together, vertical members connected at their lower end with said upper frame and at their top terminating in a handle, and a guide for the vertical members of the upper frame, said guide inclosing the vertical members of both frames.

4. A device of the character described, comprising a lower frame provided with a series of loops each having an integral depending support, vertical members connected at their lower end with said frame and at their top terminating in a handle, an upper frame provided with a series of loops adapted to be in alinement with the loops of the lower frame, a spring connecting said frames together, vertical members connected at their lower end with said upper frame and at their top terminating in a handle, and a guide for the upper end of the vertical members of the upper frame, said guide attached to the handle at the upper end of said vertical members and inclosing the vertical members of the lower frame.

5. A device of the character described, comprising a lower frame provided with a series of loops each having an integral depending support, vertical members connected at their lower end with said frame and at their top terminating in a handle, an upper frame provided with a series of loops adapted to be in alinement with the loops of the lower frame, a spring connecting said frames together, vertical members connected at their lower end with said upper frame and at their top terminating in a handle, and guides for the vertical members of said frames, one of said guides attached to the vertical members of the upper frame and inclosing the vertical members of both frames and the other of said guides attached to the handle of the vertical members of the upper frame and inclosing the vertical members of the lower frame.

In testimony whereof we have affixed our signatures in presence of two witnesses.

LOUIS A. KING.
CHARLES N. KING.

Witnesses:
ALBAN ANDRÉN,
HELEN S. ANDRÉN.